US007185099B1

(12) United States Patent
Block

(10) Patent No.: US 7,185,099 B1
(45) Date of Patent: Feb. 27, 2007

(54) APPARATUS AND METHOD FOR COMMUNICATING BETWEEN COMPUTER SYSTEMS USING A SLIDING SEND WINDOW FOR ORDERED MESSAGES IN A CLUSTERED COMPUTING ENVIRONMENT

(75) Inventor: Timothy Roy Block, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 773 days.

(21) Appl. No.: 09/718,924

(22) Filed: Nov. 22, 2000

(51) Int. Cl.
*G06F 15/16* (2006.01)
(52) U.S. Cl. ...................... 709/230; 709/201
(58) Field of Classification Search ............ 709/230, 709/231, 237, 204, 201, 202, 205, 232; 370/235, 370/270, 389, 399, 412, 413
See application file for complete search history.

(56) References Cited

U.S. PATENT DOCUMENTS

| 4,709,365 | A | | 11/1987 | Beale et al. | |
|---|---|---|---|---|---|
| 5,146,590 | A | | 9/1992 | Lorie et al. | |
| 5,179,699 | A | | 1/1993 | Iyer et al. | |
| 5,502,818 | A | | 3/1996 | Lamberg | |
| 5,528,605 | A | * | 6/1996 | Ywoskus et al. | 714/749 |
| 5,640,554 | A | | 6/1997 | Take | |
| 5,704,032 | A | | 12/1997 | Badovinatz et al. | |
| 5,729,687 | A | | 3/1998 | Rothrock et al. | |
| 5,787,249 | A | | 7/1998 | Badovinatz et al. | |
| 5,805,786 | A | | 9/1998 | Badovinatz et al. | |
| 5,883,939 | A | | 3/1999 | Friedman et al. | |
| 5,926,619 | A | | 7/1999 | Badovinatz et al. | |
| 5,973,724 | A | | 10/1999 | Riddle | |

(Continued)

FOREIGN PATENT DOCUMENTS

JP  05-204811 A  8/1993

(Continued)

OTHER PUBLICATIONS

Paul et al., "Reliable Multicast Transport Protocol (RMTP)," Apr. 1997, IEEE Journal on Selected Areas In Communications, vol. 15, No. 3, pp. 407-421.*

(Continued)

*Primary Examiner*—Krisna Lim
*Assistant Examiner*—Sean Reilly
(74) *Attorney, Agent, or Firm*—Martin & Associates, LLC; Derek P. Martin

(57) ABSTRACT

A clustered computer system includes multiple computer systems (or nodes) coupled together via one or more networks that can become members of a group to work on a particular task. Each node includes a cluster engine, a cluster communication mechanism that includes a sliding send window, and one or more service tasks that process messages. The sliding send window allows a node to send out multiple messages without waiting for an individual acknowledgment to each message. The sliding send window also allows a node that received the multiple messages to send a single acknowledge message for multiple received messages. By using a sliding send window to communicate with other computer systems in the cluster, the communication traffic in the cluster is greatly reduced, thereby enhancing the overall performance of the cluster. In addition, the latency between multiple messages sent concurrently is dramatically reduced.

15 Claims, 8 Drawing Sheets

U.S. PATENT DOCUMENTS

| | | | |
|---|---|---|---|
| 6,006,259 | A | 12/1999 | Adelman et al. |
| 6,065,062 | A | 5/2000 | Periasamy et al. |
| 6,078,957 | A | 6/2000 | Adelman et al. |
| 6,108,699 | A | 8/2000 | Moiin |
| 6,115,749 | A * | 9/2000 | Golestani et al. ........... 709/235 |
| 6,192,411 | B1 | 2/2001 | Chan et al. |
| 6,216,150 | B1 | 4/2001 | Badovinatz et al. |
| 6,292,905 | B1 | 9/2001 | Wallach et al. |
| 6,298,041 | B1 * | 10/2001 | Packer ....................... 370/231 |
| 6,317,867 | B1 | 11/2001 | Elnozahy |
| 6,338,092 | B1 * | 1/2002 | Chao et al. ................. 709/236 |
| 6,343,320 | B1 | 1/2002 | Fairchild et al. |
| 6,363,495 | B1 | 3/2002 | MacKenzie et al. |
| 6,367,029 | B1 | 4/2002 | Mayhead et al. |
| 6,381,215 | B1 | 4/2002 | Hamilton et al. |
| 6,392,993 | B1 * | 5/2002 | Hamilton et al. ........... 370/230 |
| 6,408,310 | B1 | 6/2002 | Hart |
| 6,425,014 | B1 | 7/2002 | Aiken, Jr. et al. |
| 6,427,148 | B1 | 7/2002 | Cossock |
| 6,449,641 | B1 | 9/2002 | Moiin et al. |
| 6,460,039 | B1 | 10/2002 | Pinter et al. |
| 6,496,481 | B1 * | 12/2002 | Wu et al. ................... 370/242 |
| 6,507,863 | B2 | 1/2003 | Novaes |
| 6,529,958 | B1 | 3/2003 | Oba et al. |
| 6,545,981 | B1 * | 4/2003 | Garcia et al. ............... 370/242 |
| 6,564,372 | B1 | 5/2003 | Babaian et al. |
| 6,574,668 | B1 * | 6/2003 | Gubbi et al. ................ 709/237 |
| 6,578,032 | B1 | 6/2003 | Chandrasekar et al. |
| 6,611,923 | B1 | 8/2003 | Mutalik et al. |
| 6,625,118 | B1 * | 9/2003 | Hadi Salim et al. ........ 370/229 |
| 6,625,639 | B1 * | 9/2003 | Miller et al. ................ 718/106 |
| 6,654,757 | B1 * | 11/2003 | Stern .......................... 707/101 |
| 6,718,361 | B1 | 4/2004 | Basani et al. |
| 6,757,698 | B2 | 6/2004 | McBride et al. |
| 6,823,512 | B1 * | 11/2004 | Miller et al. ................ 718/103 |
| 6,839,752 | B1 * | 1/2005 | Miller et al. ................ 709/224 |
| 6,847,984 | B1 | 1/2005 | Midgley et al. |
| 6,973,473 | B1 * | 12/2005 | Novaes et al. .............. 709/201 |
| 2002/0165977 | A1 | 11/2002 | Novaes |
| 2003/0041138 | A1 | 2/2003 | Kampe et al. |

FOREIGN PATENT DOCUMENTS

| | | | |
|---|---|---|---|
| JP | 07-311753 A | 11/1995 | |
| JP | 2000-156706 A | 6/2000 | |
| JP | 2000-196677 A | 7/2000 | |

OTHER PUBLICATIONS

USPTO; Interim Guidelines for Examination of Patent Applications for Patent Subject Matter Eligibility http://www.uspto.gov/web/offices/pac/dapp/opla/preognotice/guidelines101_20051026.pdf; Oct. 26, 2005.*

IBM Technical Disclosure Bulletin (Jun. 1996, vol. 39, issue No. 6, pp. 63-68).*

Robert Miller, IBM Patent Application filed Dec. 7, 2000, U.S. Appl. No. 09/732,198, "Peer Protocol Status Query In Clustered Computer System."

Robert Miller et al., IBM Patent Application filed Oct. 27, 2000, U.S. Appl. No. 09/697,398, "Group Data Sharing During Membership Change In Clustered Computer System."

Robert Miller et al., IBM Patent Application filed Aug. 14, 2000, U.S. Appl. No. 09/638,328, "Merge Protocol for Clustered Computer System".

Arindam Banerji et al, "High-Performance Distributed Shared Memory Substrate for Workstation Clusters", in Proc. of the Second IEEE Int'l Symposium on High Performance Distributed Computing, Jan. 1993.

Jing-Chiou Liou et al, "A Comparison of General Approaches to Multiprocessor Scheduling", Parallel Processing Symposium, 1997. Proceedings, 11th International, Apr. 1-5, 1997, pp. 152-156.

Leszek Lilien, "Quasi-Partitioning: A New Paradigm for Transaction Execution in Partitioned Distributed Database Systems", Data Engineering, 1989, Proceedings, Fifth International Conference on Feb. 6-10, 1989, pp. 546-553.

Pei Yunzhang et al, "Totally Ordered Reliable Multicast for Whiteboard Application", Department of Computer Science and Technology, Tsinghua University, Beijing, 1999, pp. 1-7.

Wanlei Zhou et al, "Parallel Recovery in a Replicated Object Environment", School of Computing and Mathematics, Deakin University, pp. 1-6.

D. A. Agarwal et al, "Reliable Ordered Delivery Protocol for Interconnected Local-Area Networks", In Proc. of the International Conference on Network Protocols, Tokyo, Japan, Nov. 1995, pp. 365-374.

* cited by examiner

1: set last msg dest and test dest of next msg for match
   if match, set Delayed ACK flag, otherwise clear Delayed ACK flag
2: start msg timer
3: send m1
   m1 (seq1=1, seq2=1, Delayed ACK Flag=1)
   m1 (seq1=1, seq2=1, Delayed ACK Flag=1)
   m1 (seq1=50, seq2=50, Delayed ACK Flag=1)

1': start delayed ACK timer
   2': deliver m1 to CLUE

4: test dest of next message (m3) for match with dest of current msg (m2)
   if match, set Delayed ACK flag, otherwise clear Delayed ACK flag
5: send m2
   m2 (seq1=1, seq2=2, Delayed ACK Flag=0)
   m2 (seq1=1, seq2=2, Delayed ACK Flag=0)
   m2 (seq1=50, seq2=51, Delayed ACK Flag=0)

3': clear delayed ACK timer
   4': deliver m2 to CLUE
   5': ACK m1 and m2 seq1=1, seq2=2, ACK
   seq1=1, seq2=2, ACK
   seq1=50, seq2=51, ACK

FIG. 15

6: test send queue, m3 is last msg in send queue (for the moment)
7: restart msg timer, reset message dest
8: send m3
   m3 (seq1=3, seq2=3, Delayed ACK Flag=1)

6': start delayed ACK timer
   7': B delivers m1 to its CLUE

9: test latecomer msg m4, dest does not match dest of last msg (m3)
10: send immediate ACK request for m3
   seq1=3, seq2=3, Null Msg Flag=1

8': reset delayed ACK timer
   9': B delivers requested ACK for m3 seq1=3, seq2=3, ACK

11: restart msg timer, reset message dest
12: send m4
   m4 (seq1=4, seq2=4, Delayed ACK Flag=1)
   m4 (seq1=4, seq2=4, Delayed ACK Flag=1)
   m4 (seq1=52, seq2=52, Delayed ACK Flag=1)

10': B's, D's, and C's delayed ACK timers all fire
   11': B, D and C deliver ACK for m4 seq1=4, seq2=4, ACK
   seq1=4, seq2=4, ACK
   seq1=52, seq2=52, ACK

13: reset msg timer, reset message dest

APPARATUS AND METHOD FOR COMMUNICATING BETWEEN COMPUTER SYSTEMS USING A SLIDING SEND WINDOW FOR ORDERED MESSAGES IN A CLUSTERED COMPUTING ENVIRONMENT

BACKGROUND OF THE INVENTION

1. Technical Field

This invention generally relates to data processing, and more specifically relates to the sharing of tasks between computers on a network.

2. Background Art

Since the dawn of the computer age, computer systems have become indispensable in many fields of human endeavor including engineering design, machine and process control, and information storage and access. In the early days of computers, companies such as banks, industry, and the government would purchase a single computer which satisfied their needs, but by the early 1950's many companies had multiple computers and the need to move data from one computer to another became apparent. At this time computer networks began being developed to allow computers to work together.

Networked computers are capable of performing tasks that no single computer could perform. In addition, networks allow low cost personal computer systems to connect to larger systems to perform tasks that such low cost systems could not perform alone. Most companies in the United States today have one or more computer networks. The topology and size of the networks may vary according to the computer systems being networked and the design of the system administrator. It is very common, in fact, for companies to have multiple computer networks. Many large companies have a sophisticated blend of local area networks (LANs) and wide area networks (WANs) that effectively connect most computers in the company to each other.

With multiple computers hooked together on a network, it soon became apparent that networked computers could be used to complete tasks by delegating different portions of the task to different computers on the network, which can then process their respective portions in parallel. In one specific configuration for shared computing on a network, the concept of a computer "cluster" has been used to define groups of computer systems on the network that can work in parallel on different portions of a task. In addition, a computer cluster provides a "single-system image" with highly reliable services. Multiple systems in a cluster can appear as one computer system to a user, and the services and resources the user needs are always available even if one of the computer systems in the cluster fails or is taken down for maintenance.

One way for computers in a cluster to cooperate to perform a task uses the concept of ordered messages. In an ordered message system, each message is communicated to all nodes, typically using IP multicast, and the order of messages is enforced so that all nodes see the messages from a given source in the same order. In a prior art clustered computing environment, each message is processed by each node before proceeding to process the next message. In other words, the prior art for communicating in a clustered computing environment that uses ordered messages has a send window with a single message, which corresponds to a fixed send window size of one.

The concept of a "sliding send window" is known in the art with reference to Transmission Control Protocol (TCP) point-to-point messages. A sliding send window allows multiple messages to be sent without waiting for an individual acknowledgment to each message before sending the next message. While a sliding send window is known for point-to-point communications using TCP, a sliding send window has not been used in a clustered computing environment because it presents particular problems that have not been solved to date. In particular, the requirement for processing ordered messages that are multicast to several nodes in the same order on all nodes is not possible using the prior art TCP sliding send window, because IP does not enforce the ordering of messages. For this reason, IP multicast communications in a clustered computing environment have not benefitted from the use of a sliding send window. Without a mechanism and method for providing a sliding send window that may be used in a clustered computing environment, the performance of clustered computer systems will continue to be limited by the present fixed send window size of one.

DISCLOSURE OF INVENTION

According to the preferred embodiments, a clustered computer system includes multiple computer systems (or nodes) coupled together via one or more networks that can become members of a group to work on a particular task. Each node includes a cluster engine, a cluster communication mechanism that includes a sliding send window, and one or more service tasks that process messages. The sliding send window allows a node to send out multiple messages without waiting for an individual acknowledgment to each message. The sliding send window also allows a node that received the multiple messages to send a single acknowledge message for multiple received messages. By using a sliding send window to communicate with other computer systems in the cluster, the communication traffic in the cluster is greatly reduced, thereby enhancing the overall performance of the cluster. In addition, the latency between multiple messages sent concurrently is dramatically reduced.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 15 is a diagram that shows the interaction between the nodes of FIG. 13 in accordance with the preferred embodiments.

BEST MODE FOR CARRYIN OUT THE INVENTION

Figure 1:
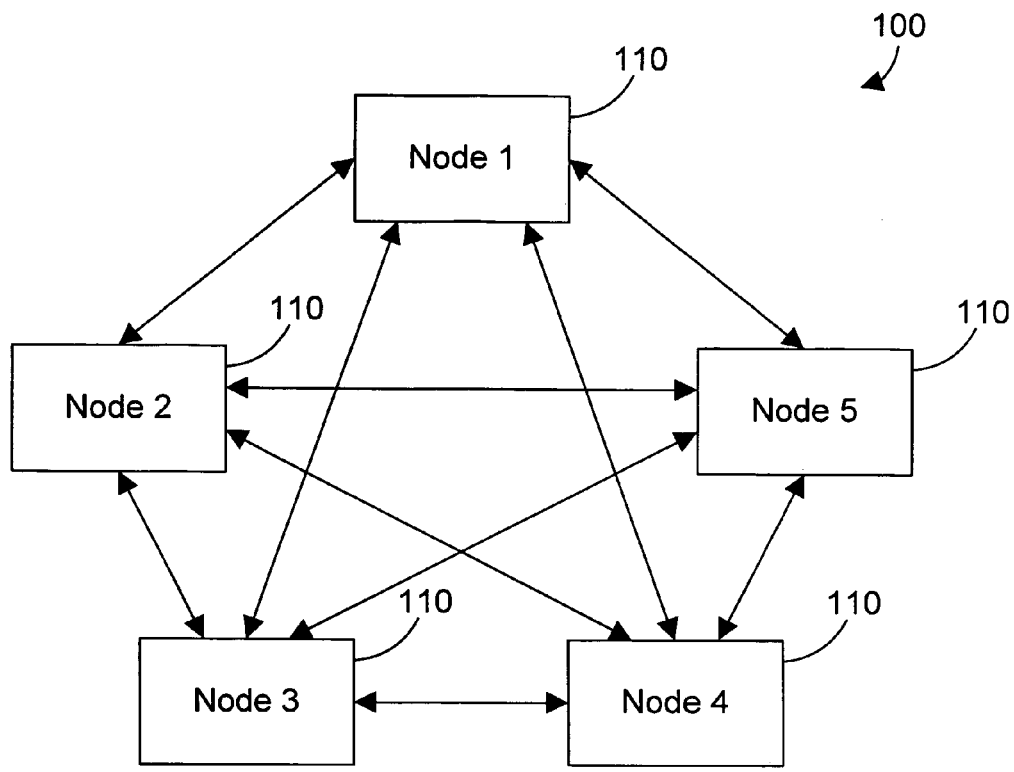
FIG. 1 is a block diagram of computer systems that may intercommunicate on a network.

The present invention is accomplished through sharing portions of tasks on computers that are connected on a network. For those who are not familiar with networking concepts, the brief overview below provides background information that will help the reader to understand the present invention.

1. Overview

Networked Computer Systems

Connecting computers together on a network requires some form of networking software. Over the years, the power and sophistication of networking software has greatly increased. Networking software typically defines a protocol for exchanging information between computers on a network. Many different network protocols are known in the art. Examples of commercially-available networking software is Novell Netware and Windows NT, which each implement different protocols for exchanging information between computers.

One significant computer network that has recently become very popular is the Internet. The Internet grew out of a proliferation of computers and networks, and has evolved into a sophisticated worldwide network of computer systems. Using the Internet, a user may access computers all over the world from a single workstation. TCP/IP (Transmission Control Protocol/Internet Protocol) is an example of a network protocol that is in wide use today for point-to-point communication between two computers via the Internet. In addition, the use of TCP/IP is also rapidly expanding to more local area networks (LANs) and Intranets within companies.

User Datagram Protocol (UDP) is another example of a known network protocol. UDP does not have much of the overhead associated with TCP, but also does not have the reliability of TCP. In TCP, two computer systems communicate point-to-point by establishing a "connection" between the two. If the receiving node fails to receive a message sent by the sending node, the sending node will see that the receiving node did not acknowledge the message, and will re-send the message. UDP, on the other hand, does not deal with "connections", and has no architected way for verifying receipt of a message. As a result, the sending computer system has no way of knowing whether or not the message was received. UDP has been used successfully in an IP multicast environment in a computer cluster, but requires significant system-level code to manage the messages sent and received by UDP to assure reliable communications. In essence, by removing some of the overhead of TCP by using UDP, a lower-level implementation is made available to the programmers of system-level code, thereby providing greater flexibility in implementing low-level communication protocols for computer clusters.

Computer Clusters

The prior art recognized the benefit of having groups of computer systems work on different pieces of a problem. The concept of "clusters" of computers evolved to include a predefined group of networked computers that can share portions of a larger task. One specific implementation of a cluster uses ordered messages for communicating between the computers in a cluster. In an ordered message system, each message is communicated to all nodes, and the order of messages is enforced so that all nodes see the messages in the same order. One known way to simultaneously broadcast ordered messages to multiple computers uses IP multicast.

Figure 2:
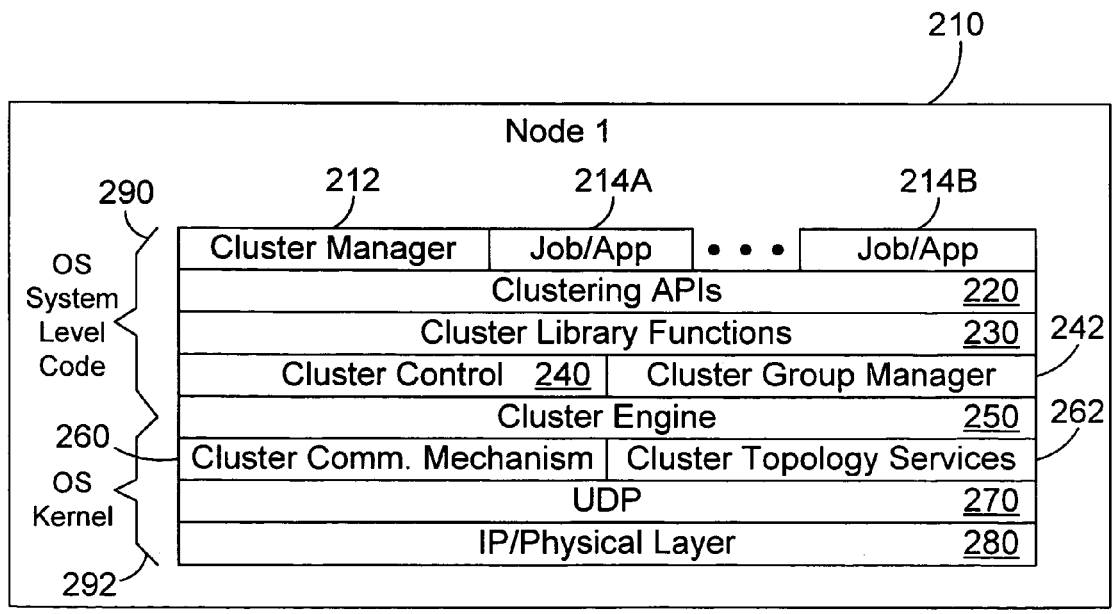
FIG. 2 is a block diagram of programs that run on a prior art node to support multicast communication in a clustered computing environment.

Referring to FIG. 1, a simple cluster 100 of five computer systems (or "nodes") 110 is shown. The connections between these nodes represents a logical connection, and the physical connections can vary within the scope of the preferred embodiments so long as the nodes in the cluster can logically communicate with each other. Within a cluster, one or more "groups" may be defined, which correspond to logical groupings of nodes that cooperate to accomplish some task. Each node in a group is said to be a "member" of that group. As shown in FIG. 2, each node 210 in a prior art cluster includes an operating system that includes system level code 290 and a kernel 292.

The kernel 292 represents the low-level operating system code that interacts directly with the computer system hardware. The lowest layer is the IP/Physical layer 280, which is the layer of operating system software that communicates over a physical communication medium. On top of the IP/Physical layer 280 is the UDP layer 270, which provides a network protocol for exchanging messages between computer systems. Cluster topology services 262 and cluster communications 260 reside on top of the UDP layer 270. Cluster topology services 262 maintains the current topology view of the cluster and provides support for changing the topology of the cluster by adding or deleting members from the cluster as required. Cluster communications 260 is a mechanism that provides support for transmission and receipt of ordered messages from each other computer system in the cluster. Cluster communication mechanism 260 assures ordering of messages to and from a single source, but does not assure ordering between messages to or from different computer systems. Cluster engine 250 (also known as CLUE) receives messages from other nodes via the cluster communications mechanism 260, and assures total ordering of all messages from all sources. CLUE 250 is a software process that enforces ordered messages between nodes in a cluster. When CLUE 250 receives a message from its member that is intended for the group, CLUE 250 sends the message to all registered members of the group via a cluster communication mechanism that typically uses IP multicast when available. Note that some of the CLUE code is properly considered as part of the kernel 292, while other parts of CLUE are properly considered as system level code 290, which is the reason that it appears in FIG. 2 that the cluster engine 250 contains some of each.

A cluster control layer 240 and a cluster group manager 242 sit on top of the CLUE layer 250. Cluster control 240 manages the configuration and activation of clustering on a node, typically supporting various cluster initialization and node management operations suitable for managing a clustered environment. Cluster group manager 242 synchronously maintains copies of group membership status information across the cluster, while the cluster library functions 230 provide other support services for a cluster. Clustering API component 220 provides the external interface to the underlying clustering functionality via jobs/applications 214 (such as job/app 214A and job/app 214B shown in FIG. 2). Cluster manager 212 provides a user interface by which a user may initiate modification of cluster communication parameters.

Figure 3:
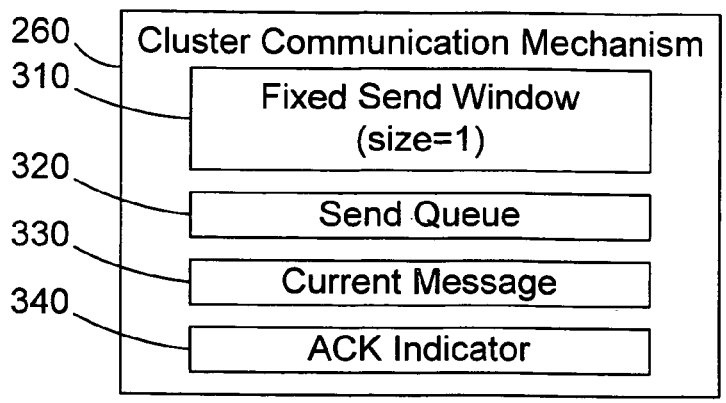
FIG. 3 is a block diagram of the clustered communication mechanism 260 shown in FIG. 2.

A prior art implementation of the cluster communication mechanism 260 is shown in FIG. 3. A fixed send window of size one 310 is used in conjunction with a send queue 320 that contains messages to be sent, a current message attribute 330 that indicates which message is currently being worked on, and an ACK indicator 340 that contains information relative to which nodes have acknowledged the current message.

2. Detailed Description

According to preferred embodiments of the present invention, an apparatus and method provide a sliding send window in a clustered computing environment. The sliding send window allows multiple messages to be sent without waiting for an individual response to each message. Instead, a single acknowledge message may be sent that acknowledges receipt of multiple messages. Using a sliding send window for communicating between computer systems in a cluster results in a substantial reduction in network traffic, thereby increasing the performance of the cluster.

Figure 4:
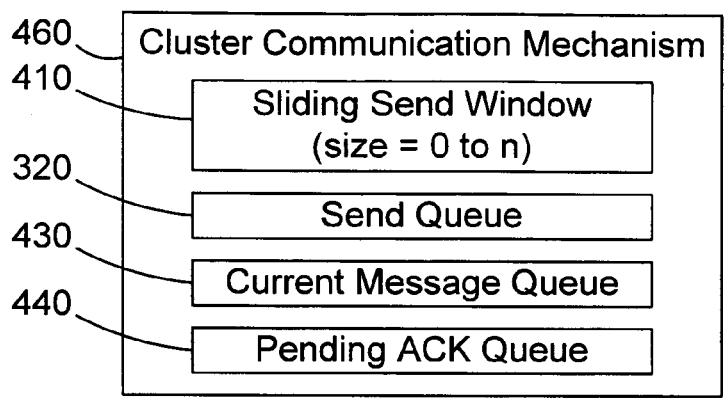
FIG. 4 is a block diagram of a clustered communication mechanism in accordance with the preferred embodiments.

Referring now to FIG. 4, a cluster communication mechanism 460 in accordance with the preferred embodiments includes a sliding send window 410 that allows sending multiple messages to the members of a group in the cluster without individually acknowledging receipt of each message by all members of the group. The send queue 320 is preferably the same as in the prior art implementation of FIG. 3, but could be an alternative implementation as well. The current message queue 430 and pending ACK queue 440 are expanded in function compared to their counterparts 330 and 340, respectively, in the prior art, to handle multiple messages (i.e., from single data attributes to a queue or vector (2-dimensional) entities).

Figure 5:
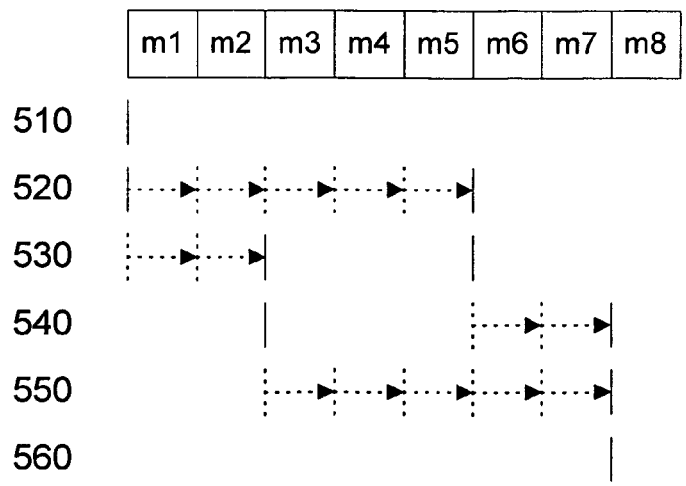
FIG. 5 is a diagram showing the concepts behind the sliding send window of the preferred embodiments.

An example of a sliding send window 410 in FIG. 4 is shown graphically in FIG. 5. For this example, we assume that the send window is initially zero (no messages), as shown at 510 in FIG. 5. We assume that five messages m1–m5 are sent out one after the other, without receiving an ACK for any of these messages, as shown at 520. The sliding send window expands one message at a time until it is five messages wide, m1–m5, as shown at 520. Next, we assume that ACKs for m1 and m2 are received, which causes the sliding send window to slide down to a width of three messages, m3–m5, as shown at 530. We assume that two more messages m6 and m7 are then sent, which causes the size of the sliding send window to increase to five messages, m3–m7. We then assume that ACKs for all of these messages are received, which slides the sliding send window down to zero, as shown at 550, to a size of zero, as shown in 560. FIG. 5 illustrates why the send window is referred to as a "sliding" send window. Its size varies (or slides) according to the total number of messages that are pending and the number of those messages that have been acknowledged.

Figure 6:
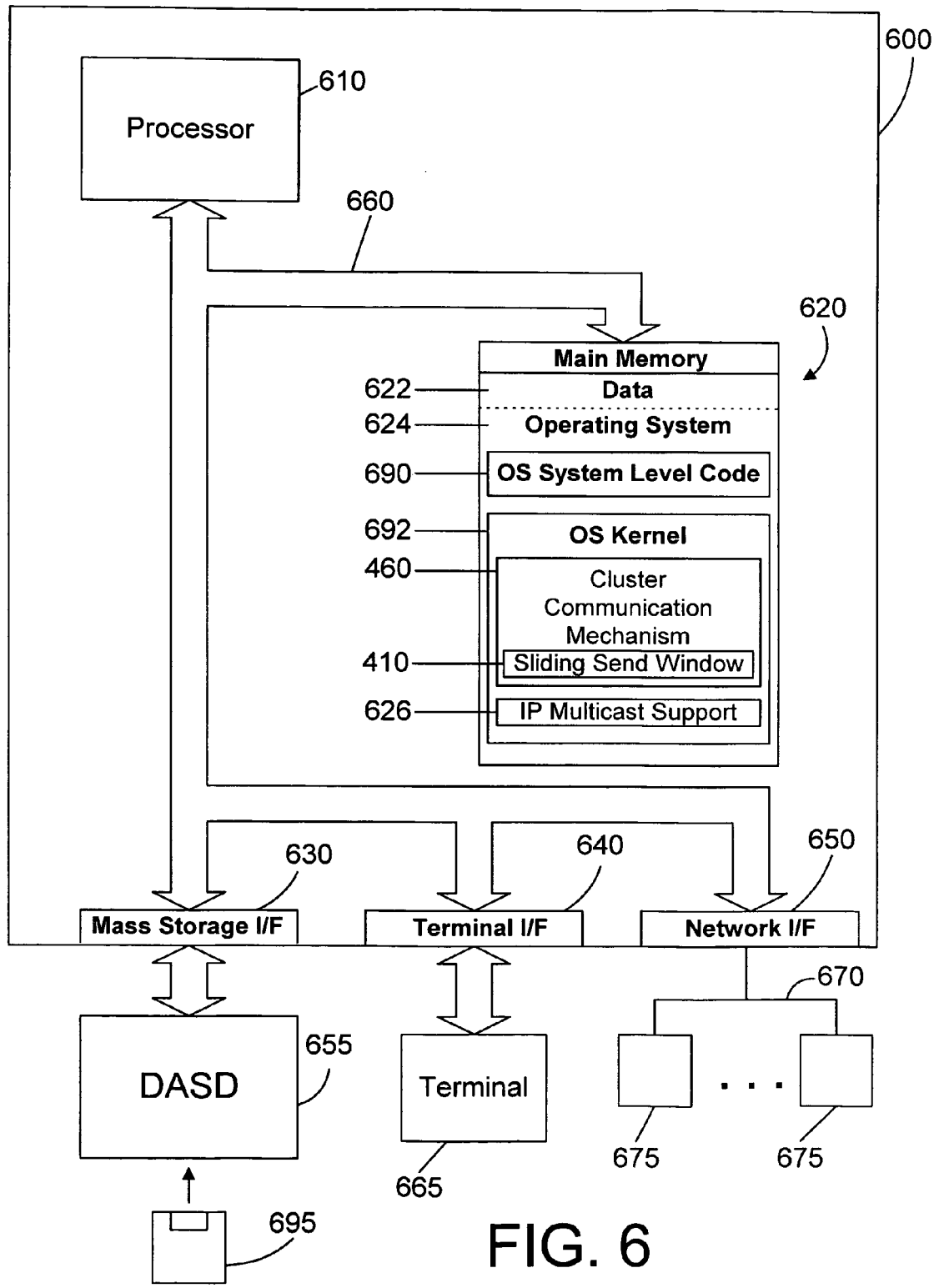
FIG. 6 is a block diagram of a computer system in accordance with the preferred embodiments that serves as a node in a cluster.

Referring now to FIG. 6, a computer system 600 is an enhanced IBM iSeries computer system, and represents one suitable type of node 110 (FIG. 1) that can be networked together in accordance with the preferred embodiments. Those skilled in the art will appreciate that the mechanisms and apparatus of the present invention apply equally to any computer system that can be networked together with other computer systems. As shown in FIG. 6, computer system 600 comprises a processor 610 connected to a main memory 620, a mass storage interface 630, a terminal interface 640, and a network interface 650. These system components are interconnected through the use of a system bus 660. Mass storage interface 630 is used to connect mass storage devices (such as a direct access storage device 655) to computer system 600. One specific type of direct access storage device 655 is a floppy disk drive, which may store data to and read data from a floppy diskette 695.

Main memory 620 contains data 622 and an operating system 624. Data 622 represents any data that serves as input to or output from any program in computer system 600. Operating system 624 is a multitasking operating system known in the industry as OS/400; however, those skilled in the art will appreciate that the spirit and scope of the present invention is not limited to any one operating system. Operating system 624 includes OS system level code 690 and a kernel 692. Note that system level code 690 may be the same or similar to OS system level code 290 in FIG. 2, or may be completely different within the scope of the preferred embodiments. The OS kernel 692 includes a cluster communication mechanism 460 that includes a sliding send window 410 that is used to communicate with other nodes in a cluster. OS kernel 692 additionally includes IP multicast support 626, which is a portion of an IP/physical layer (similar to 280 in FIG. 2) that is used by the cluster communication mechanism 460 to communicate with other members of the group via IP multicast. Note that the preferred embodiments expressly extends to both point-to-point communications and multicast communications on a computer network in any combination.

Computer system 600 utilizes well known virtual addressing mechanisms that allow the programs of computer system 600 to behave as if they only have access to a large, single storage entity instead of access to multiple, smaller storage entities such as main memory 620 and DASD device 655. Therefore, while data 622 and operating system 624 are shown to reside in main memory 620, those skilled in the art will recognize that these items are not necessarily all completely contained in main memory 620 at the same time. It should also be noted that the term "memory" is used herein to generically refer to the entire virtual memory of computer system 600.

Processor 610 may be constructed from one or more microprocessors and/or integrated circuits. Processor 610 executes program instructions stored in main memory 620. Main memory 620 stores programs and data that processor 610 may access. When computer system 600 starts up, processor 610 initially executes the program instructions that make up operating system 624. Operating system 624 is a sophisticated program that manages the resources of computer system 600. Some of these resources are processor 610, main memory 620, mass storage interface 630, terminal interface 640, network interface 650, and system bus 660. Although computer system 600 is shown to contain only a single processor and a single system bus, those skilled in the art will appreciate that the present invention may be practiced using a computer system that has multiple processors and/or multiple buses.

Terminal interface 640 is used to directly connect one or more terminals 665 to computer system 600. These terminals 665, which may be non-intelligent (i.e., dumb) terminals or fully programmable workstations, are used to allow system administrators and users to communicate with computer system 600. Note, however, that while terminal interface 640 is provided to support communication with one or more terminals 665, computer system 600 does not necessarily require a terminal 665, because all needed interaction with users and other processes may occur via network interface 650.

Network interface 650 is used to connect other computer systems and/or workstations (e.g., 675 in FIG. 6) to computer system 600 across a network 670. Network 670 represents the logical connections between computer system 600 and other computer systems on the network 670. The present invention applies equally no matter how computer system 600 may be connected to other computer systems and/or workstations, regardless of whether the network connection 670 is made using present-day analog and/or digital techniques or via some networking mechanism of the future. In addition, many different network protocols can be used to implement a network. These protocols are specialized computer programs that allow computers to communicate across network 670. TCP (Transmission Control Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 695 of FIG. 6) and CD ROM, and transmission type media such as digital and analog communications links.

Figure 7:
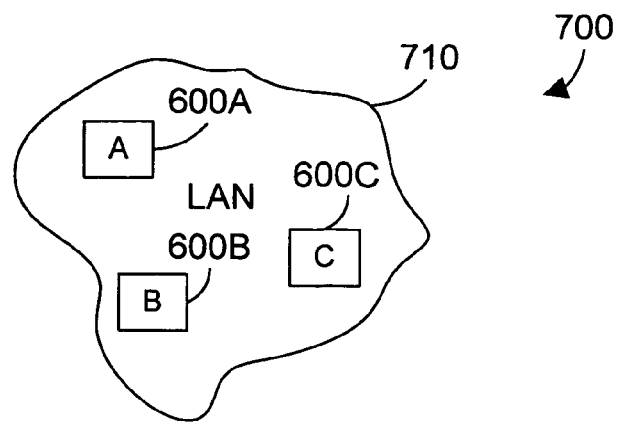
FIG. 7 is a block diagram showing three different computer systems that are interconnected via a local area network (LAN) in a cluster.
Figure 8:
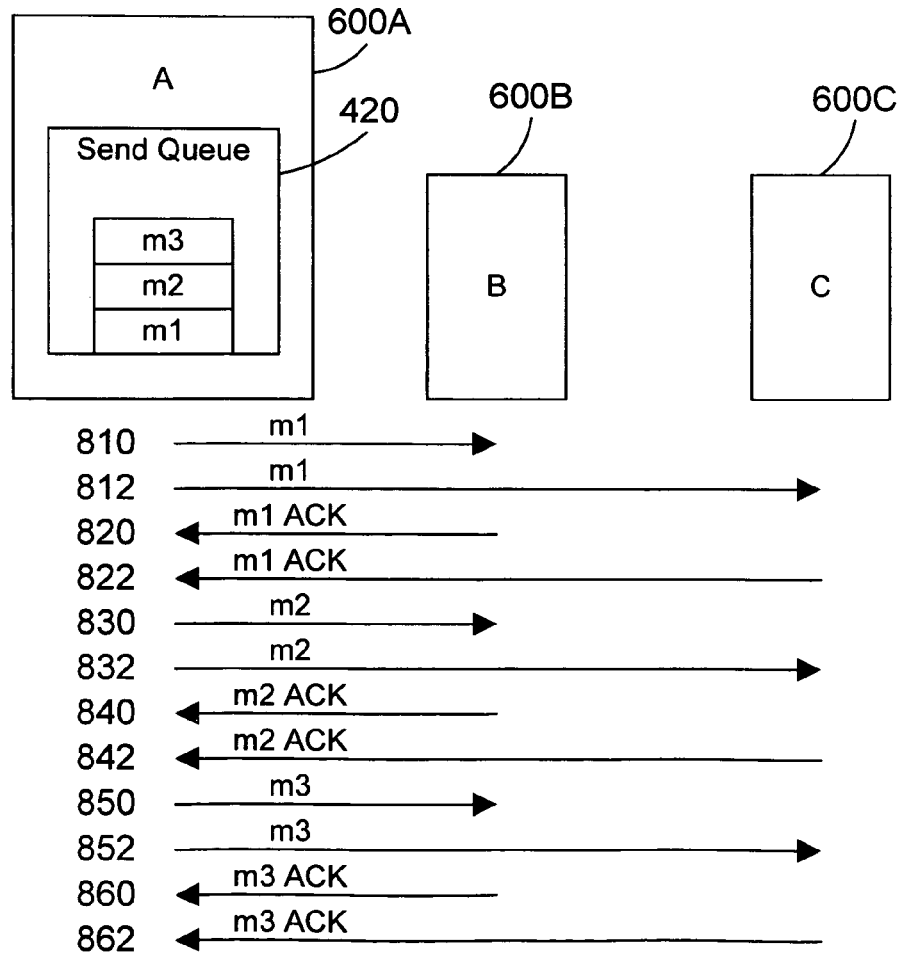
FIG. 8 is a diagram that shows the prior art interaction between the nodes of FIG. 7.

Referring now to FIG. 7, a sample network configuration 700 is shown where three nodes 600A (node A), 600B (node B) and 600C (node C) are all connected together on a local area network (LAN). This is the most common network configuration for computer clusters known in the art. FIG. 8 illustrates the network traffic under the prior art for the network in FIG. 7. We assume that the send queue 420 in node A has three ordered messages that need to be sent to nodes B and C in the same order as they were written to the send queue 420. We assume that m1 was received first in the send queue 420, followed by m2 and m3. First, node A communicates m1 to node B in step 810. Next, node A communicates m1 to node C in step 812. Node A must now wait until an acknowledge message (referred to herein as an ACK) is received from each node that received m1 before sending m2. Thus, node A waits until an ACK for m1 is received from node B in step 820 and an ACK for m1 is received from node C in step 822. Now that all other members of the group have responded to m1 with a corresponding ACK, node A may now send out m2 to node B (step 830) and to node C (step 832). Now node A must wait again until an ACK is received from both node B (step 840) and node C (step 842). Once all ACKs for m2 are received, node A can send out m3 to node B (step 850) and node C (step 852). Node A waits again until an ACK is received from node B (step 860) and from node C (step 862). FIG. 8 graphically shows that a node (such as node A) must wait for an ACK from each member of a group before sending out the next message. This is done to assure that the processing of messages is performed in the same order as received. However, the waiting for an ACK for each message before sending out the next message results in a bottleneck by serializing all outgoing messages. This serialization of outgoing messages results in system performance penalties by waiting for each ACK before proceeding to the next message.

Figure 9:
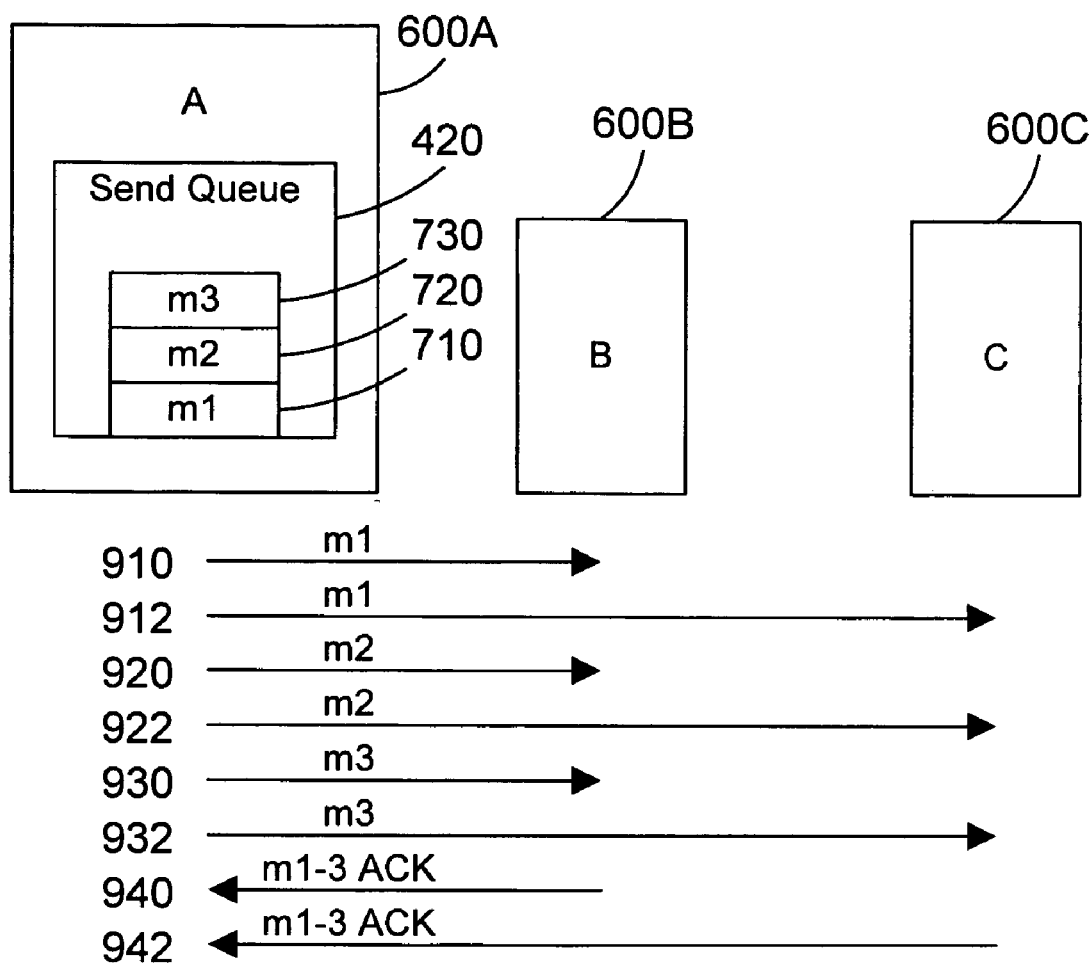
FIG. 9 is a diagram that shows the interaction between the nodes of FIG. 7 in accordance with the preferred embodiments.

The concepts of the preferred embodiments may be easily compared and contrasted with the example of FIGS. 7 and 8 by reviewing FIG. 9 with respect to the same network configuration in FIG. 7. In the preferred embodiments, a sliding send window is used that allows a node to send out multiple ordered messages without waiting for an acknowledge signal for each individual message. Thus, node A in FIG. 9 sends out m1 to node B in step 910, and sends out m2 to node C in step 912. Node A can then send out m2 in steps 920 and 922 and m3 in steps 930 and 932 without waiting for an ACK for m1 from nodes B and C. Each of nodes B and C can then send a single ACK that acknowledges all of messages m1, m2 and m3 at once, rather than requiring three separate ACKs from node B and three separate ACKs from node C, as shown in the prior art in FIG. 8. The benefit of the preferred embodiments is thus two-fold. First, node A can continue to send out messages without waiting for individual ACKs from each node for each message, thereby keeping the work pipeline for the cluster more full. And second, the nodes that received m1, m2 and m3 can acknowledge with a single ACK that acknowledges multiple messages at the same time, thereby significantly reducing the number of ACKs required in a clustered computing environment. By allowing a sending node to send out multiple messages without waiting for an individual acknowledgment for each one before sending out the next, and by allowing a recipient to acknowledge multiple messages with a single acknowledgment, the performance of a clustered computing system in accordance with the preferred embodiments in significantly increased.

Note that the communications in FIG. 9 are shown as point-to-point communications between node A and nodes B and C. However, it is equally within the scope of the preferred embodiments to communicate between nodes using IP multicast. In this scenario, steps 910 and 912 of FIG. 9 would be merged into a single step that broadcasts m1 to both B and C using IP multicast. Similarly, steps 920 and 922 could be replaced with a single IP multicast step, and steps 930 and 932 could be replaced with a single IP multicast step. The preferred embodiments expressly extend to point-to-point communications, multicast communications, and any suitable combination of the two.

Figure 10:
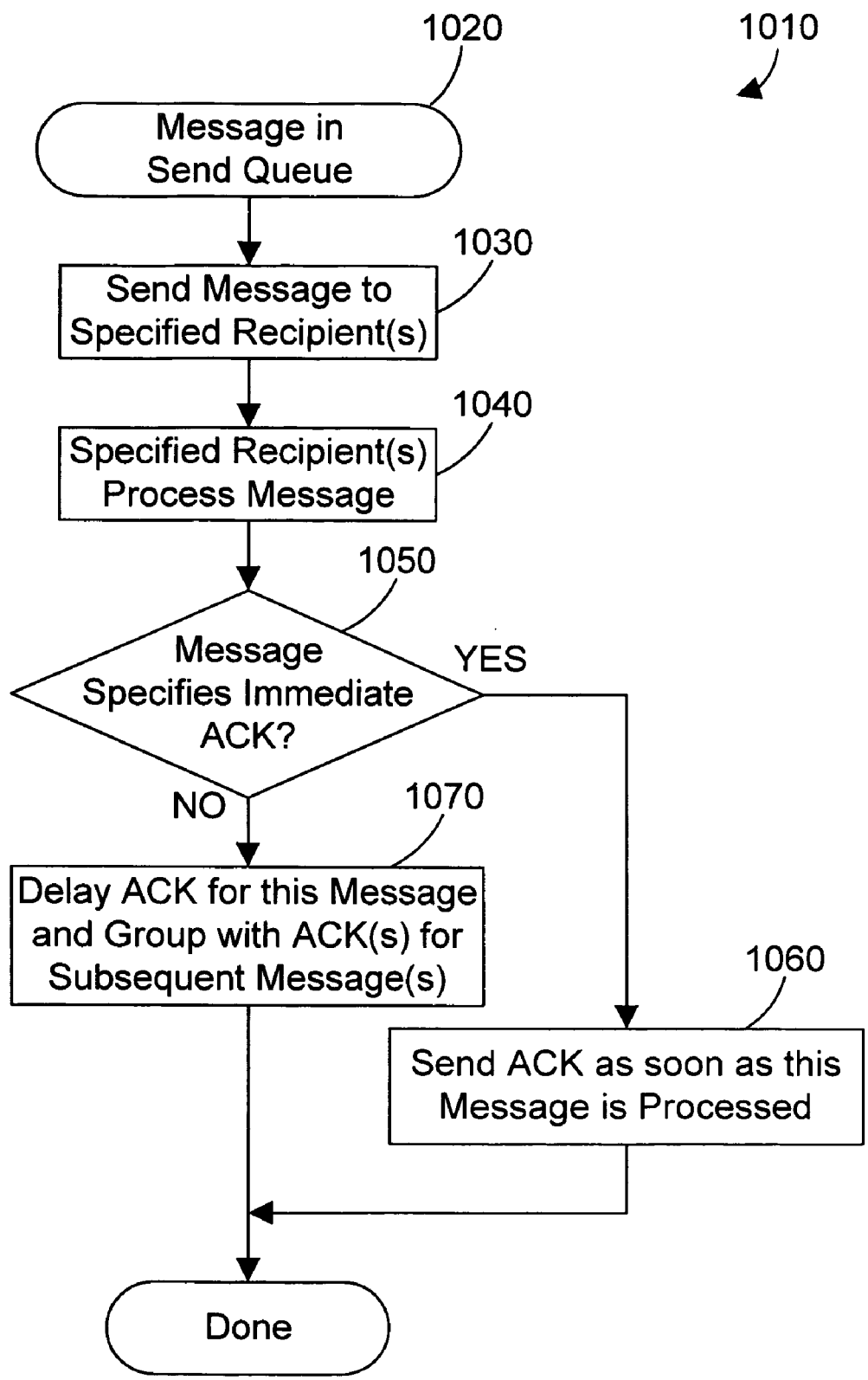
FIG. 10 is a flow diagram of a method for implementing a sliding send window in accordance with the preferred embodiments.

Referring now to FIG. 10, a method 1010 shows the steps performed in one exemplary method in accordance with the preferred embodiments when a message is in the send queue of a node (step 1020). The message is sent to the specified recipients (step 1030). The message may be a multicast message for all nodes in a group, or may be a point-to-point message that is communicated directly to each recipient node. Note that the recipient node(s) may be different than the nodes in a group, allowing multicast and point-to-point communications to be intermingled while preserving the ordering of messages from a particular source. The specified recipients then process the message (step 1040). If the message specifies an immediate acknowledge (or ACK) (step 1050=YES), the ACK is sent by each recipient as soon as the recipient processes the message (step 1060). However, if the message does not specify an immediate acknowledge (step 1050=NO), the ACK for the message is delayed and grouped with one or more ACKs for subsequent messages (step 1070). In this manner a recipient can group together ACKs into a single ACK that specifies that multiple messages are being acknowledged.

Figure 11:
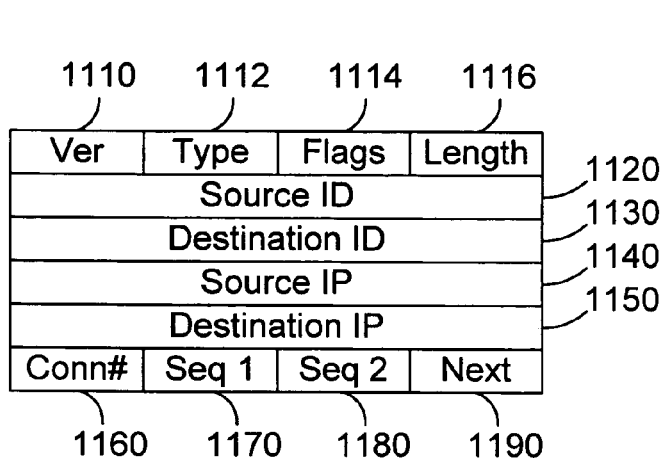
FIG. 11 is a block diagram showing the information contained in a message header in accordance with the preferred embodiments.

Each message that is broadcast to another node includes a header with various information, such as the header 1100 shown by way of example in FIG. 11. Header 1100 includes a version field 1110 that identifies the version number of the cluster communication mechanism that sent the message, a type field 1112 that identifies the type of the message, a flags field 1114 that has various flags that provide information regarding the message, and a length field 1116 that indicates the length of the message. A source ID field 1120 identifies which node sent the message, while the destination ID field 1130 identifies which node or nodes should receive the message. The source IP field 1140 specifies the internet protocol (IP) address of the sender, while the destination IP field 1150 specifies the IP address of the destination node. A connection number field 1160 contains a number that corresponds to a connection between two nodes or a node and a subnet (and thus a group of nodes on that subnet). The sequence number fields 1170 and 1180 indicate sequential numbers that indicate a sequence number for the particular message being sent. The next field 1190 is currently an unused field that mirrors the value in the seq1 field 1170.

Figure 12:
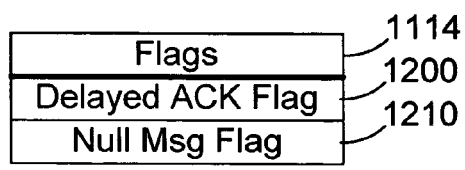
FIG. 12 is a block diagram showing that a delayed ACK flag is part of the flags portion 1114 of the header in FIG. 11.

The flags field 1114 of FIG. 11 includes a delayed ACK flag 1200 as shown in FIG. 12. The delayed ACK flag is used to indicate whether or not an ACK message must be sent immediately. If the delayed ACK flag is set, the recipient may wait and group the ACK for several messages including this message together at a later time. If the delayed ACK flag is cleared, the recipient must ACK immediately. Note that ACKing immediately means simply sending an ACK after the message is processed, and this ACK may in fact be a group ACK for this message plus one or more messages that were previously processed. The significance of the delayed ACK flag is that an ACK for this message is required by the sender before it can send out the next message, whether the ACK is a single ACK for this message only or an ACK that is for this message and for one or more earlier messages.

Figure 13:
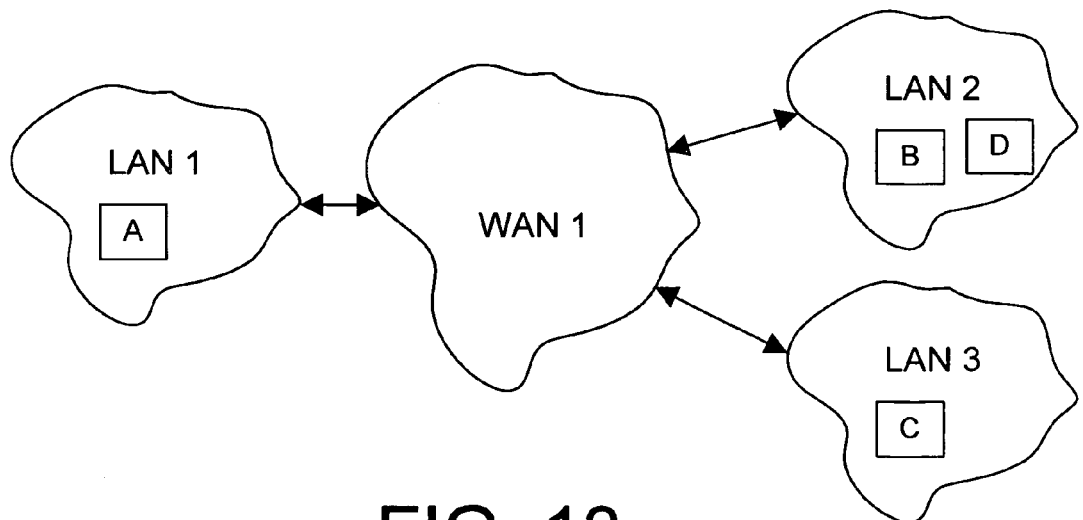
FIG. 13 is a block diagram that shows a sample hybrid network connection between four nodes located on different local area networks (LANs)

Referring now to FIG. 13, a sample network configuration is shown to further illustrate the concepts of the preferred embodiments. In this configuration, a node A is a node on LAN 1, nodes B and D are nodes on LAN 2, and node C is a node on LAN 3. LAN 1, LAN 2 and LAN 3 are all coupled together via a wide area network WAN 1. The network configuration in FIG. 13 is more complex that the simple LAN configuration in FIG. 7, and helps to illustrate some of the salient features of the preferred embodiments, as described below.

Figure 14:
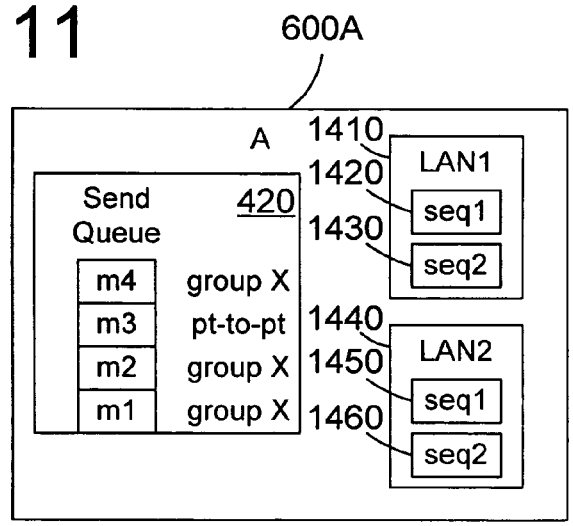
FIG. 14 is a block diagram showing features of node A shown in FIGS. 13 and 15.

FIG. 14 illustrates some of the features of node A shown in FIG. 13. Node A includes a send queue 420, and an object 1410 that tracks sequence numbers for LAN1, and an object 1440 that tracks sequence numbers for LAN2. Send queue 420 includes four messages, m1–m4. For this example, we assume that m1, m2 and m4 are messages from group X, which we define to be nodes A, B, C and D. We also assume that m3 is a point-to-point message for node B. The interaction between nodes A, B, C and D in FIG. 13 is shown in FIG. 15.

Before explaining the details of FIG. 15, the concepts that underlie FIG. 15 need to be explained. We assume that node A includes a message timer, which is set to the maximum time allowed to receive an ACK before the message is considered lost and must be resent. Node A also includes a last message destination register and can compare the last message destination with the current message destination or with the next message destination. We also assume that nodes B, C and D each include a delayed ACK timer. Each nodes' delayed ACK timer is used to make sure an ACK is eventually sent if too much time passes. When a node receives a message, it starts its delayed ACK timer. If the delayed ACK timer fires before the node has ACK'd the message, it will then ACK the message in response to the ACK timer firing.

In step 1 of FIG. 15, the last message destination register in node A is set, and the next message (m1) is compared to the stored destination of the last message. We assume for this example that the last message (preceding m1) was to group X. Because the last message destination is the same as the destination for the next message m2, the delayed ACK flag is set. The message timer is started (step 2), and m1 is sent (step 3). Referring again to FIG. 14, we assume for this example that seq1 1420 and seq2 1430 for LAN1 1410 both equal one, and that seq1 1450 and seq2 1460 for LAN2 1440 both equal fifty. These numbers, one and fifty, are arbitrary, and are assigned different values to allow distinguishing between sequence numbers for LAN1 and LAN2.

Sending out m1 is done by sending m1 to node B with seq1=1 and seq2=1 in the m1 header (see FIG. 11), with the delayed ACK flag set to one (true). Message m1 is then sent to node D in the same manner. Message m1 is then sent to node C with seq1=50 and seq2=50, with the delayed ACK flag set to one. When each of nodes B, C and D receives m1, they start their respective delayed ACK timers (step 1') and deliver m1 to their respective CLUEs (step 2'). Note that any message that has both sequence numbers seq1 and seq2 equal to the same value signals to the recipient nodes that this is the first message of a new send window, which indicates that all previous messages have been sent and ACK'd with no outstanding messages.

Next, node A tests the destination of the next message m3 to see if it matches the destination of the current message m2. Message m3 is a point-to-point message between node A and node B, while message m2 is for all nodes in group X, namely B, C and D. Because the destinations of these message do not match, the delayed ACK flag is set to zero (false), and m2 is sent. Message m2 to nodes B and D increments seq2 to 2 to indicate that the sliding send window has increased to two messages, m1 and m2. Note, however, that the delayed ACK flag is cleared in message m2, which requires nodes B, C and D to ACK all messages in the sliding send window before sending out the next message. Nodes B, C and D see that the delayed ACK flag for m2 is cleared, which requires them to each ACK the outstanding messages. First, the delayed ACK time is cleared (step 3'), m2 is delivered to the respective CLUE (step 4'), and a single ACK message is returned from each of nodes B, C and D that acknowledges both m1 and m2 by using the sequence numbers of the ACK message to indicate which messages are being ACK'd. Thus, nodes B and D ACK with seq1=1 and seq2=2, while node C ACKs with seq1=50 and seq2=51. At this point node A can resume sending messages, because ACKs for all outstanding messages have been received.

Node A next tests its send queue, and sees that m3 is the last message in the send queue at this particular point in time (step 6). In response, node A restarts its message timer, and resets the message destination (step 7). Message m3 is then sent out. Note that m3 is a point-to-point message from node A to node B. The sequence numbers are incremented to 3, and the delayed ACK flag is set to true, and m3 is then sent (step 8). In response, node B starts its delayed ACK timer (step 6'), and node B delivers m1 to its CLUE (step 7').

We assume now that message m4 then arrives in the send queue. Message m4's destination (group X) does not match the destination of the last message m3 (node B) (step 9), so the previous point-to-point message from node A to node B needs to be ACK'd before proceeding. An ACK request message is sent by setting the sequence numbers seq1 and seq2 to the value of the message or messages to be ACK'd, and setting the null message flag to true (step 10). A node interprets the null message flag as a command to immediately ACK outstanding messages. As a result, node B resets its delayed ACK timer (step 8'), and node B delivers the requested ACK for m3 (step 9'). The preferred embodiments are unique in the respect that not all nodes are required to receive all messages, which would force nodes to receive and evaluate all messages, which uses network bandwidth and CPU resources. Instead, a message is only sent to its intended recipient(s), with a null message forcing ACKs to pending messages when the destination changes.

At this point the message timer is restarted and the message destination is reset (step 11). Message m4 is then sent out (step 12). Note that the sequence numbers for nodes B and D are both 4, while the sequence number for node C is 52. Node B expects the sequence number of the next message to be 4 because it has seen all of the messages thus far. Note, however, that node C expects the sequence number of the next message to be 3 because it did not see the point-to-point message m3 from node A to node B. The architecture of the system in accordance with the preferred embodiments is defined so that a node that receives a sequence number that is higher than the expected number simply trusts the sender who set seq1=seq2 indicating that the sender saw all necessary ACKs, and that the node was not supposed to receive the messages it missed. Thus, when node D sees message m4 with sequence numbers seq1 and seq2 of 4, it trusts that the previous message was not intended for it, and thus proceeds to process m4 without worrying about missing m3.

We assume that node A has no more messages to send, so eventually the delayed ACK timers on nodes B, C and D will all fire (step 10'), causing each of these nodes to deliver an ACK to m4 with the appropriate sequence numbers (step 11') as shown in FIG. 15. The message timer is then reset, and the message destination is reset (step 13), and node A then awaits the next message.

The specific example in FIGS. 13–15 includes implementation-specific details. This example is shown to illustrate some of the salient features of the preferred embodiments, and should not be construed as limiting. The preferred embodiment expressly extends to any mechanism and method for providing a sliding send window in a clustered computing environment that uses ordered messages.

The present invention as described with reference to the preferred embodiments herein provides significant improvements over the prior art. A sliding send window may now be used in a clustered computing environment capable of multicast messaging, which was previously impossible to do. By providing a sliding send window, the sender need not wait for an ACK to a message before sending the next message. Furthermore, the recipient may delay and acknowledge several messages with a single acknowledge message back to the sender. In this manner the cluster is kept busier processing messages and network traffic is greatly reduced, thereby increasing the performance of the system.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

I claim:

1. An apparatus comprising:
- at least one processor;
- a memory coupled to the at least one processor;
- a network interface that couples the apparatus to a network that is coupled to a plurality of other computer systems and wherein the apparatus and the plurality of other computer systems form a cluster of computers that cooperate via ordered messages to perform a task; and
- a cluster communication mechanism residing in the memory and executed by the at least one processor, the cluster communication mechanism including a sliding send window that communicates at least one ordered message to a plurality of the other computer systems without waiting for an acknowledge message from any of the plurality of other computer systems before sending out the next ordered message, and wherein each ordered message includes a header with information that indicates whether an acknowledge message for the ordered messages may be delayed and grouped with at least one subsequent acknowledge message, and the cluster communication mechanism enforces execution order of a plurality of received messages to perform the task;
- wherein the cluster communication mechanism sends a null message forcing acknowledges to pending messages to be sent by the plurality of other computer systems when the cluster communication mechanism changes to a new destination for sending subsequent messages.

2. The apparatus of claim 1 wherein at least one of the plurality of other computers includes a message timer to determine to send an acknowledge without waiting to send a group acknowledge when the header indicates that an acknowledge message can be delayed and grouped with at least one subsequent acknowledge message.

3. A networked computer system comprising:
- a cluster of computer systems that cooperate via ordered messages to perform a task wherein each computer system includes:
  - a network interface that couples each computer system via a network to other computer systems in the cluster;
  - a memory; and
  - a cluster communication mechanism residing in the memory, the cluster communication mechanism enforcing execution order of a plurality of received messages to perform the task, the cluster communication mechanism including a sliding send window that communicates at least one ordered message to a plurality of other computer systems without waiting for an acknowledgment from any of the plurality of other computer systems before sending out the next ordered message;
- wherein the cluster communication mechanism sends a null message forcing acknowledges to pending messages to be sent by the plurality of other computer systems when the cluster communication mechanism changes to a new destination for sending subsequent messages.

4. A computer-implemented method for processing a task in a clustered computing environment, the method comprising the steps of:
- providing a cluster communication mechanism executing on a first computer system in a cluster wherein the computers in the cluster cooperate via ordered messages to perform the task and wherein the cluster communications mechanism includes a sliding send window that communicates at least one ordered message to a plurality of other computer systems in the cluster without waiting for an acknowledgment from each computer system in the cluster that received an ordered message before sending out the next ordered message, and wherein the cluster communication mechanism enforces execution order of a plurality of received messages to perform the task;
- the cluster communication mechanism sending a first ordered message to a first plurality of other computer systems in the cluster; and
- the cluster communication mechanism sending a second ordered message to a second plurality of other computer systems in the cluster without waiting for a response to the first ordered message from each of the first plurality of other computer systems in the cluster;
- wherein the cluster communication mechanism sends a null message forcing acknowledges to pending messages to be sent by the plurality of other computer systems when the cluster communication mechanism changes to a new destination for sending subsequent messages.

5. The method of claim 4 further comprising the step of at least one of the first plurality of other computer systems in the cluster responding to the first and second ordered messages by sending a single acknowledge message to the cluster communication mechanism that acknowledges both the first and second ordered messages.

6. The method of claim 4 wherein the first and second ordered messages each include a header with information that indicates whether an acknowledge message for the first and second ordered messages may be delayed and grouped with at least one subsequent acknowledge message.

7. A program product comprising:
(A) a computer program comprising:
  (A1) a cluster communication mechanism that includes a sliding send window that communicates at least one ordered message to a plurality of other computer systems in a cluster computer system that cooperate via ordered messages to perform a task without waiting for an acknowledgment from any of the plurality of other computer systems before sending out the next ordered message, and wherein the cluster communication mechanism enforces execution of a plurality of received messages to perform the task, wherein the cluster communication mechanism sends a null message forcing acknowledges to pending messages to be sent by the plurality of other computer systems when the cluster communication mechanism changes to a new destination for sending subsequent messages; and
(B) recordable media bearing the computer program.

8. The program product of claim 7 wherein each ordered message includes a header with information that indicates whether an acknowledge message for the ordered messages may be delayed and grouped with at least one subsequent acknowledge message.

9. The apparatus of claim 1 wherein the cluster communication mechanism communicates the at least one ordered message to the plurality of other computer systems via IP multicast.

10. The method of claim 4 wherein first plurality of computer systems includes all computer systems in the second plurality of computer systems.

11. The method of claim 4 wherein the first plurality of computer system comprises the second plurality of computer systems.

12. The method of claim 4 wherein the cluster communication mechanism communicates the at least one ordered message to the plurality of other computer systems via IP multicast.

13. The program product of claim 7 wherein the cluster communication mechanism communicates the at least one ordered message to the plurality of other computer systems via IP multicast.

14. The method of claim 4 wherein at least one of the plurality of other computers includes a message timer to determine to send an acknowledge without waiting to send a group acknowledge when the header indicates that an acknowledge message can be delayed and grouped with at least one subsequent acknowledge message.

15. The program product of claim 7 wherein at least one of the plurality of other computers includes a message timer to determine to send an acknowledge without waiting to send a group acknowledge when the header indicates that an acknowledge message can be delayed and grouped with at least one subsequent acknowledge message.

* * * * *